F. A. ROJAS.

RHEOSTAT.

APPLICATION FILED JAN. 30, 1922.

Reissued Oct. 24, 1922. 15,478.

Fig. 2,

Fig. 3,

Florical A. Rojas

INVENTOR

BY Pennie, Davis, Marvin & Edmonds his ATTORNEYS

Reissued Oct. 24, 1922. Re. 15,478

UNITED STATES PATENT OFFICE.

FLORICEL A. ROJAS, OF NEW YORK, N. Y.

RHEOSTAT.

Original No. 1,315,579, dated September 9, 1919, Serial No. 187,323, filed August 20, 1917. Application for reissue filed January 30, 1922. Serial No. 532,921.

*To all whom it may concern:*

Be it known that I, FLORICEL ARQUIMEDES ROJAS, a citizen of the Dominican Republic, residing at 1121 Woodycrest Avenue, New York city, in the county of Bronx, State of New York, have invented certain new and useful Improvements in Rheostats; and I do hereby declare the following to be a full, clear, and exact description of the invention, such as will enable others skilled in the art to which it appertains to make and use the same.

My invention relates to improvements in electric controlling devices in which the electric conductance of the specially arranged conductive and non-conductive substances is made to vary by compressing or expanding them between two bodies. This combination of conductive and non-conductive substances constitutes what will be called my resistance material, and will totally or partially take the place of the resistance coil of the ordinary rheostat.

The objects of my invention are, first, to provide a rheostat so constructed that its resistance can be made to vary consecutively from a very high degree of resistance down to the small fraction of an ohm; second, to afford facilities for increasing the ampere carrying capacity of the rheostat; third, to provide means by which the temperature co-efficient of the resistance material can be made a negligible quantity; and, fourth, to afford means by which the resistance material can be so arranged as to have the value of its specific resistance and of its length and cross section suit the electrical dimensions of the circuit which the rheostat is to control.

Figure 1:
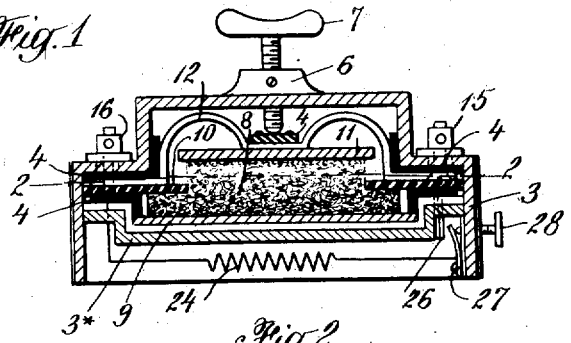
Figure 1:
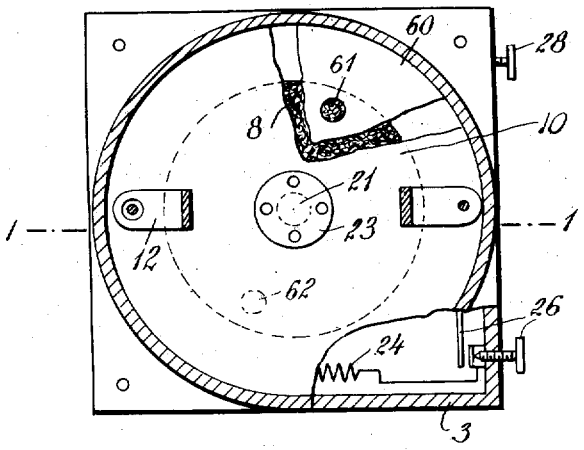
Figure 1:
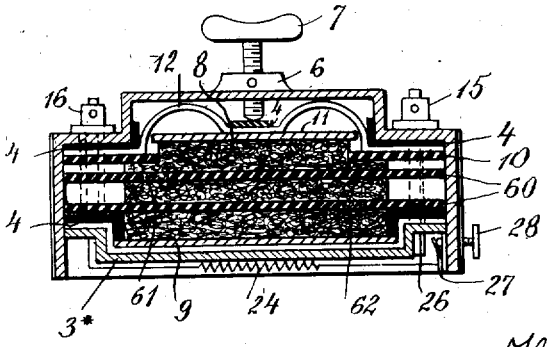

I attain these objects by mechanism, illustrated in the accompanying drawings, in which Fig. 1 is a vertical section through the rheostat on a plane corresponding to the plane of the line 1—1 of Fig. 2, Fig. 2 is a horizontal central section of a modified form of the rheostat with parts broken away to show the interior construction and corresponding to the plane of line 2—2 of Fig. 1, and Fig. 3 is a vertical central section of a still further modified form of rheostat taken on a plane corresponding to line 1—1 of Fig. 2 and combining features of the rheostats shown in Figs. 1 and 2.

In the various figures, numerals 4 refer to insulations, numerals 10 and 60 to insulating diaphragms, and numerals 8 to the resistance material.

In Figs. 1, 2 and 3, the receptacle 3 constitutes the framework of the rheostat and has a bottom 3* located therein. At the hub 6 of the frame a threaded hole engages the screw 7; plates 9 and 11 form the electrodes or terminals between which the resistance material 8 is located, the plate 11 being electrically connected to the metallic spring 12 and insulated from the screw 7 by means of insulation 4. The metallic spring 12 is insulated from the plate 9 by means of an annular diaphragm 10 and the spring 12 and plate 9 are also insulated from the receptacle 3 by means of insulations 4.

The spring 12 is electrically connected to the binding post 15 by the screw shown in dotted lines in Fig. 1 and constitutes therewith one terminal of the rheostat, the other terminal being formed by connecting binding post 16 to plate 9 by means of a similar screw shown in a similar manner in the same figure. These binding posts are insulated from the frame by means of insulating washers.

The space inclosed by the plate 11 and plate 9 constitutes the receptacle for the resistance material.

By means of a suitable sticky material applied to the inner surfaces of these plates, those portions of the resistance material which come in contact with them are made to adhere to the plates, and when the plates are separated, the diaphragm 10 will serve as a stripper acting to help disarrange the close contact which the particles of the resistance material assume under compression. A heavy oil and powdered graphite may be used as an adhesive material for covering the surfaces of the plates.

By loosening or tightening the screw 7 which acts in conjunction with the spring 12, the plate 11 can be made to move to and fro within the space occupied by the resistance material and by this action the resistance material may be subjected to any degree of compression and the electro-resistance of the circuit can thereby be made to vary consecutively from a very high to a very low degree of resistance.

While I have found the sticky material mentioned to be very effective in operation, I do not intend to limit myself to the preferred example stated, but may use any equivalent means for effecting a positive drawing apart of the fibres or particles composing the resistance material.

The wire coil resistance 24, shown in Figs. 1, 2 and 3, can be circuited in parallel connection with the resistance material by means of contact plate 26 which is connected to binding post 15, as shown in dotted lines. By turning the screw 28 until spring 27 is forced into contact with the plate 26, the current may be shunted through coil 24 and if desired any number of these coils of different resistance may be similarly connected to increase the conductibility of the rheostat.

The annular diaphragm 10 shown in Fig. 2, is of a different construction from that shown in Fig. 1, in that the aperture 21 in Fig. 2 is of considerably smaller diameter and is concealed by the metallic plate 23, the purpose of this plate being to prevent the substance composing the resistance material, if of a powdered nature, from spilling out.

Figs. 2 and 3 also illustrate an arrangement by which the length and cross section of the resistance material can be so arranged as to control a high voltage current within a comparatively small and limited space.

In Fig. 2, 10 is an insulating diaphragm carrying the metallic plate 23 which seals the aperture 21. Through this aperture 21 the plate 23 comes into electric contact with the top layer of the resistance material, this top layer being insulated by means of the diaphragm 60 from the second layer of resistance material which is shown through aperture 61 but both layers are electrically connected through this aperture 61. Another insulating diaphragm having an aperture at 62 electrically insulates the second layer from a third layer of the resistance material. As many of these layers and insulating diaphragms can be piled up electrically as desired. By having the apertures of the two succeeding diaphragms placed diametrically opposed to each other, the electric current can be forced to follow a tortuous path and thus the path can be so lengthened as to be within the requisites of the given voltage and the size of the aperture will enter into determining its ampere carrying capacity.

The plate 23 if desired can be removed and the resistance material made to adhere directly to the plunger 11 as shown in Fig. 3 and by operating the screw 7, the particles of the resistance material of these layers can be forced together or drawn apart thus increasing or decreasing the conductivity of the layers and thus the dimensions of the electric current led to the binding posts 15 or 16 can be readily adjusted to a given value.

The sticky or adhesive material may be applied to the terminal plates only or to both the terminal plates and the surfaces of the insulating diaphragms.

The resistance material 8 is made up of conductive and non-conductive substances associated in intimate mixtures of powders, granules or filaments in a variety of ways and in accordance with the object in view. For instance, a non-conductive powder mixed with a conductive powder; a conductive powder impregnating a body of non-conductive filaments, or a non-conductive fabric, two conductive powders, one having a positive and the other a negative temperature coefficient either mixed with a non-conductive powder or impregnating a loose body of non-conductive filaments or fabrics.

Examples of these mixtures are as follows: First, asbestos powder and powdered graphite; second, granules of graphite or metal filings mixed with asbestos powder, powdered mica, glass or the powder of any refractory nonconductive substance; third, powdered graphite and asbestos filaments or cotton fabric; and, fourth, graphite in powdered or granular form, powdered German silver or manganin alloy with asbestos powder or filaments.

It is a known fact that the conductance of graphite and other allotropic forms of carbon increases with the increase of temperature while the conductance of the metals decreases with the increase of temperature and therefore it is possible to obtain, with a proper mixture of graphite and a metallic powder, a compound having a zero temperature coefficient.

I am aware that prior to my invention rheostats have been made based upon the principle of imperfect contact between solid conductors, as, for instance, piles of graphite blocks intervening between two compressing bodies. In such devices, a sudden rush of current of an appreciable strength takes place at the critical point where least contact occurs. This differs altogether from the principal object of my invention, which is that of constructing a rheostat whose resistance can be made to vary from the highest possible degree down to the smallest fraction of an ohm and will afford any desired degree of resistance between these two points. Such a variation is not possible with carbon piles or any other such arrangement of solids but is accomplished by the composition of conductive and non-conductive substances of the nature and arranged substantially as set forth in the specification and drawings.

What I claim is:

1. In a rheostat, a mass of loose, compressible resistance material, and means positively acting upon the material for drawing the material apart to lessen its conductivity.

2. In a rheostat, a compressible resistance material having a zero temperature coefficient and means for drawing the material apart to lessen its conductivity.

3. In a rheostat, a mass of loose, compressible resistance material and means, positively acting upon the material to lessen its density and thus decrease its conductivity.

4. In a rheostat, a mass of loose, resistance material including a multitude of particles of conductive material and means, positively acting upon the material for decreasing the mutual contact between the said particles to lessen the conductivity of the material as a whole.

5. In a rheostat, a mass of loose, compressible resistance material and means adhering to the material for drawing it apart to lessen its conductivity.

6. In a rheostat, adjustable terminal plates, a mass of loose, compressible resistance material between the terminal plates, means for compressing the resistance material between the said plates to increase its conductivity, means for separating the plates to release the pressure on the resistance material and means for drawing the resistance material apart to lessen its conductivity.

7. In a rheostat, adjustable terminals, a mass of loose, compressible resistance material between the terminals, means for causing the material to adhere to the terminals and means for adjusting the distance between the terminals to increase or decrease the conductivity of the resistance material.

8. In a rheostat, adjustable terminals, a compressible resistance material having a zero temperature coefficient between the terminals, means for causing the material to adhere to the terminals and means for adjusting the distance between the terminals to increase or decrease the conductivity of the resistance material.

9. In a rheostat, adjustable terminals, a mass of loose, compressible resistance material between the terminals, means for causing the material to adhere to the terminals and means for drawing the terminals apart to lessen the conductivity of the resistance material, and means for forcing the terminals toward each other to increase the conductivity.

10. In a rheostat, adjustable terminal plates, a mass of loose, compressible resistance material between the plates, adhesive means on said terminal plates for causing the material to adhere to the terminal plates, and means for drawing the terminal plates to lessen the conductivity of the resistance material and for forcing the plates toward each other to increase the conductivity.

11. In a rheostat, adjustable terminal plates, a shunt coil in the circuit, a mass of loose, compressible resistance material between the plates, means for drawing the plates apart to lessen the conductivity of the resistance material and strengthen the current in the shunt coil and for forcing the plates toward each other to increase its conductivity and lessen the current in the shunt.

12. In a rheostat, adjustable terminal plates, a plurality of shunt coils in the circuit, a mass of loose, compressible resistance material between the plates, means for drawing the plates apart to lessen the conductivity of the resistance material and strengthen the current in the shunt coils and for forcing the plates toward each other to increase its conductivity and lessen the current in the shunt.

13. In a rheostat, adjustable terminal plates, layers of compressible resistance material between the plates, insulating diaphragms interposed between the said layers, means for causing the resistance material to adhere to said plates, means for varying the conductivity of the resistance material and staggered openings in said insulating diaphragms to cause the current to travel a tortuous path through the resistance material.

14. In a rheostat, adjustable terminal plates, layers of compressible resistance material between the plates, insulating diaphragms interposed between the said layers, adhesive material on the surface of the insulating diaphragms and terminal plates to cause the layers of resistance material to adhere to the said plates and diaphragms, means for forcing the said plates together to increase the conductivity of the resistance material and for drawing the plates and consequently the material apart to decrease its conductivity, the said diaphragms having staggered openings to cause the current to travel a tortuous path through the resistance material.

15. In a rheostat, a compressible resistance material, comprising a loose mass of mixed non-conductive and conductive materials, and means positively acting upon the material for drawing it apart to lessen its conductivity.

16. In a rheostat, adjustable terminals, a compressible resistance material between the terminals comprising a loose mass of mixed non-conductive and conductive materials, means for causing the material to adhere to the terminals, and means for adjusting the distance between the terminals to increase the conductivity of the resistance material.

17. In a rheostat, a compressible resistance material comprising a loose mass of non-conductive filaments impregnated with a conductive powder, and means positively acting upon the material for drawing it apart to lessen its conductivity.

18. In a rheostat, adjustable terminals, a compressible resistance material between the terminals, comprising a loose mass of non-conductive filaments impregnated with a conductive powder, means for causing the material to adhere to the terminals, and means for adjusting the distance between the terminals to increase or decrease the conductivity of the resistance material.

19. In a rheostat, a compressible resistance material comprising a loose mass of asbestos filaments impregnated with a conductive powder, and means positively acting upon the material for drawing it apart to lessen its conductivity.

20. In a rheostat, adjustable terminals, a compressible resistance material between the terminals comprising a loose mass of asbestos filaments impregnated with a conductive powder, means for causing the material to adhere to the terminals, and means for adjusting the distance between the terminals to increase or decrease the conductivity of the resistance material.

21. In a rheostat, a compressible resistance material comprising non-conductive material and a mixture of conducting materials having a zero temperature coefficient, and means for drawing the material apart to lessen its conductivity.

22. In a rheostat, a compressible resistance material comprising non-conductive filaments impregnated with a mixture of two conductive powders, one having a positive and the other a negative temperature coefficient, said powders being mixed in such proportions that the resistance material has a zero temperature coefficient, and means for drawing the material apart to lessen its conductivity.

23. In a rheostat, a compressible resistance material comprising asbestos filaments impregnated with a mixture of graphite and metallic powders in such proportions that the resistance material has a zero temperature coefficient, and means for drawing the material apart to lessen its conductivity.

24. In a rheostat, a compressible resistance material comprising a loose mass of non-conductive filaments impregnated with graphite, and means positively acting upon the material for drawing it apart to lessen its conductivity.

25. A rheostat comprising the combination of a structureless mass of compressible resistance material, and means for positively expanding said material to vary its resistance.

26. A rheostat comprising the combination of two terminal plates, one of which is movable, a structureless mass of compressible resistance material between said plates and adhering to the movable plate, and means for moving the movable plate to compress or expand the resistance material and thus vary its resistance.

FLORICEL A. ROJAS.